United States Patent
Staiger

(10) Patent No.: US 6,296,599 B1
(45) Date of Patent: Oct. 2, 2001

(54) MACHINE-TOOL

(75) Inventor: Hans Staiger, Goeppingen (DE)

(73) Assignee: Ex-Cell-O GmbH, Eislingen (DE)

( * ) Notice: Subject to any disclaimer, the term of this patent is extended or adjusted under 35 U.S.C. 154(b) by 0 days.

(21) Appl. No.: 09/462,764

(22) PCT Filed: Jul. 29, 1998

(86) PCT No.: PCT/DE98/02159

§ 371 Date: May 4, 2000

§ 102(e) Date: May 4, 2000

(87) PCT Pub. No.: WO99/06176

PCT Pub. Date: Feb. 11, 1999

(30) Foreign Application Priority Data

Jul. 29, 1997 (DE) .............................................. 197 32 608

(51) Int. Cl.⁷ .............................. B23Q 3/157; B23C 9/00
(52) U.S. Cl. .............................. 483/3; 409/134; 409/219; 451/451
(58) Field of Search .......................... 483/3; 29/DIG. 56, 29/DIG. 59, DIG. 60; 409/134, 130, 219; 74/608; 451/451

(56) References Cited

U.S. PATENT DOCUMENTS

| 4,742,609 | * | 5/1988 | Neumann | ................. | 483/3 |
|---|---|---|---|---|---|
| 4,955,770 | * | 9/1990 | Kitamura | .............................. | 409/137 |
| 5,181,898 | * | 1/1993 | Piotrowski | ................................ | 483/3 |
| 5,439,431 | * | 8/1995 | Hessbruggen et al. | ................. | 483/14 |
| 5,704,884 | * | 1/1998 | Uemura et al. | ........................... | 483/3 |
| 5,944,079 | * | 8/1999 | Yamauchi | ............................. | 409/137 |
| 6,082,939 | * | 7/2000 | Nakashima et al. | ................. | 409/134 |
| 6,120,222 | * | 9/2000 | Hiramoto et al. | .................... | 409/134 |

FOREIGN PATENT DOCUMENTS

| 68 00 060 | | 2/1969 | (DE) . | | |
|---|---|---|---|---|---|
| 30 25 453 A1 | | 1/1982 | (DE) . | | |
| 43 07 482 A1 | | 9/1994 | (DE) . | | |
| 195 25 419 A1 | | 1/1997 | (DE) . | | |
| 816012 | * | 1/1998 | (EP) | .................................... | 409/134 |
| 295107 | * | 12/1988 | (JP) | .................................... | 409/134 |
| 10-138085 | * | 5/1998 | (JP) | .................................... | 409/134 |

* cited by examiner

Primary Examiner—William Briggs
(74) Attorney, Agent, or Firm—Oliff & Berridge, PLC

(57) ABSTRACT

A machining tool for dry processing includes an encapsulated workspace having arranged therein a workpiece support which is displaceable on a machine bed. The guide members of the workpiece carrier are arranged externally of the workspace, so that chip removal is not impeded by the workpiece support guide members.

11 Claims, 2 Drawing Sheets

MACHINE-TOOL

The invention relates to a machining tool which includes a workpiece support displaceably guided on a machine bed, in accordance with the preamble of claim 1.

Customarily, cooling lubricants are supplied during machining processing of workpieces to increase tool life by cooling and lubrication on the one hand, and to dissipate the heat introduced into the workpiece and into the tool as a result of the machining process, as well as remove the produced chips as promptly as possible from the location being processed, on the other hand.

In automotive industries it has become standard practice to use engine, running gear or body components of light metals, preferably of aluminum or magnesium alloys. Processing of such magnesium-containing alloys is, however, relatively problematic inasmuch as the chips produced in the process are easily flammable, so that a comparatively high expenditure is necessary in order to maintain the required production safety. Utilisation of cooling lubricants based on aqueous bases is not possible because magnesium reacts with such components, so that cooling lubricants containing oil must be employed. Such cooling lubricants containing oil do, however, frequently adhere to the workpieces being processed, which must then be cleaned with suitable cleaning agents after machining processing. The agents utilised for cooling and cleaning must be disposed of or separated following the processing/cleaning cycle, which involves relatively high expenditure.

In order to overcome these drawbacks, there is an increasing tendency to process the workpieces dry, i.e., without any cooling lubricants. What is essential in this processing is to carry the process chips away from the workpiece as promptly as possible during the machining process and keep them in a minimum space. In order to ensure this, the machine tools utilised for dry processing are equipped with a closed processing chamber wherein the workpiece to be processed is located, and into which the work spindle of the machining tool penetrates.

In special cases, machining in the processing chamber may furthermore be carried out under inert gas, whereby operational safety is improved.

FIG. 1, which shall be referred to as early as now, shows a top view of a machining center 1 wherein a spindle carrier 2 movable in the X and Y directions (perpendicularly to the plane of drawing) is guided on a column 4 by means of a bidirecitonal guide mechanism. The spindle carrier 2 carries a horizontal work spindle 6 for receiving a machining tool.

The machining center 1 moreover includes a tool change which may, for example, be designed as a laterally arranged revolving hopper 8 in which the tools 10 to be supplied to the work spindle 6 are accommodated.

A workpiece support (table) 12 of the machining center 1 is mounted on a machine bed (not shown here) such as to be displaceable in the forward feed direction (Z). The workpiece support 12 and the work spindle 6 are surrounded by a processing chamber 14 so as to allow for dry processing. In order to shorten the periods between work cycles, a pallet changer 16 wherein two pallets 18, 20 are mounted on pivoting means 22 is assigned to the workpiece support 12.

The pallet changer 16 carries a pivoting door 26, hereinafter referred to as a partition 26, which is closed at the top and bottom sides (parallel with the plane of the drawing). Jointly with the side walls 15 and with the peripheral walls 24 having a circular arc curvature of the processing chamber 14, the pivoting door 26 constitutes a complete encapsulation of the work range such as to allow for wet and dry processing. The pallet changer 16 moreover includes a circular arc shaped sliding door 25 which serves as an operator protection during pallet change and surrounds the pallets 18, 20 jointly with the peripheral wall 24.

As can be seen in FIG. 1, the processing chamber surrounds the entire workpiece support 12 together with the pallet 18 positioned thereon in the processing position, and also covers the linear guide mechanism 17 for the workpiece support 12 (workpiece table) formed on the machine bed.

As was already mentioned at the outset, the chips must be removed from the processing chamber as promptly as possible during dry processing of workpieces in order to avoid the risk of kindling and to also ensure proper functioning of the machining center because, e.g., the named linear guide members might be work by deposited chips. Particularly in the range of the linear guiding mechanism, chip removal is rendered difficult because the guide profiles having a comparatively complicated design —for example dovetail guides—may form dead spaces for chips to accumulate. During wet processing this problem is of minor importance because the cooling lubricant flushes the chips out of the processing range.

In contrast, the invention is based on the objective of furnishing a machining tool wherein chip removal is facilitated even during a dry processing.

This objective is attained by a machining tool having the features of claim 1.

Thanks to the measure of arranging the guide members of the workpiece support externally of the processing chamber, undesired chip deposition inside the guiding range is prevented so that wear to the guide members due to such chip deposits can reliably be prevented. Another advantage residues in the fact that the guide members, being external of the processing chamber, are freely accessible and may thus be inspected and maintenanced in an easy manner. As both the means for driving the workpiece support as well as the guide members thereof may be arranged externally of the processing chamber in the machine according to the invention, suitable cover means serving to separate the drive means from the guide sections of the workpiece support need not be provided.

In a particularly preferred embodiment, the workpiece support is designed to have at least two brackets jutting out transversely with respect to the direction of guidance, to each one of which a respective guide member is associated for support on the machine bed.

Recesses allowing the brackets to pass through the wall of the processing chamber are formed in the latter, with these recesses being sealed by suitable movable covers during the feed movement, whereby complete encapsulation of the processing range is ensured.

These cover means may, e.g., be sliding metal sheets or other telescoping metal sheets or panels fasted on the workpiece support displaceable in the feed direction, and sealingly sliding on the adjacent walls of the processing chamber.

In a particularly preferred variant, the machine bed is formed of two bed members arranged at a distance from each other, with one of the above mentioned brackets each being guided on one of the bed members.

In the range between the two bed members a chip removal mechanism is formed, whereby the chips may be removed from the processing chamber located between the two guide members.

For reinforcement of the machine bed, the two bed members are advantageously coupled by means of suitable connecting or reinforcing webs and/or a common baseplate.

The wall areas of the processing chamber being impacted upon by chips are designed to have an inclination angle of at least 50° with the horizontal so that the chips slide off along the peripheral walls of the processing chamber towards the chip removal mechanism.

The latter is preferably designed as a chip conveyor (for example scraping panels drawn by chains).

In a case where the machining tool is to be used as a high-velocity machining center, a separate drive motor for the workpiece carrier is advantageously assigned to each guide member, with the drive motors advantageously being designed as linear drive means, so that no mechanical transmission elements are required for converting the rotary movement of a drive motor to a linear movement of the workpiece support.

Further advantageous developments of the invention are the subject matters of the further appended claims.

The following serves to explain a preferred embodiment of the invention with the aid of schematic drawings, wherein.

Figure 1:
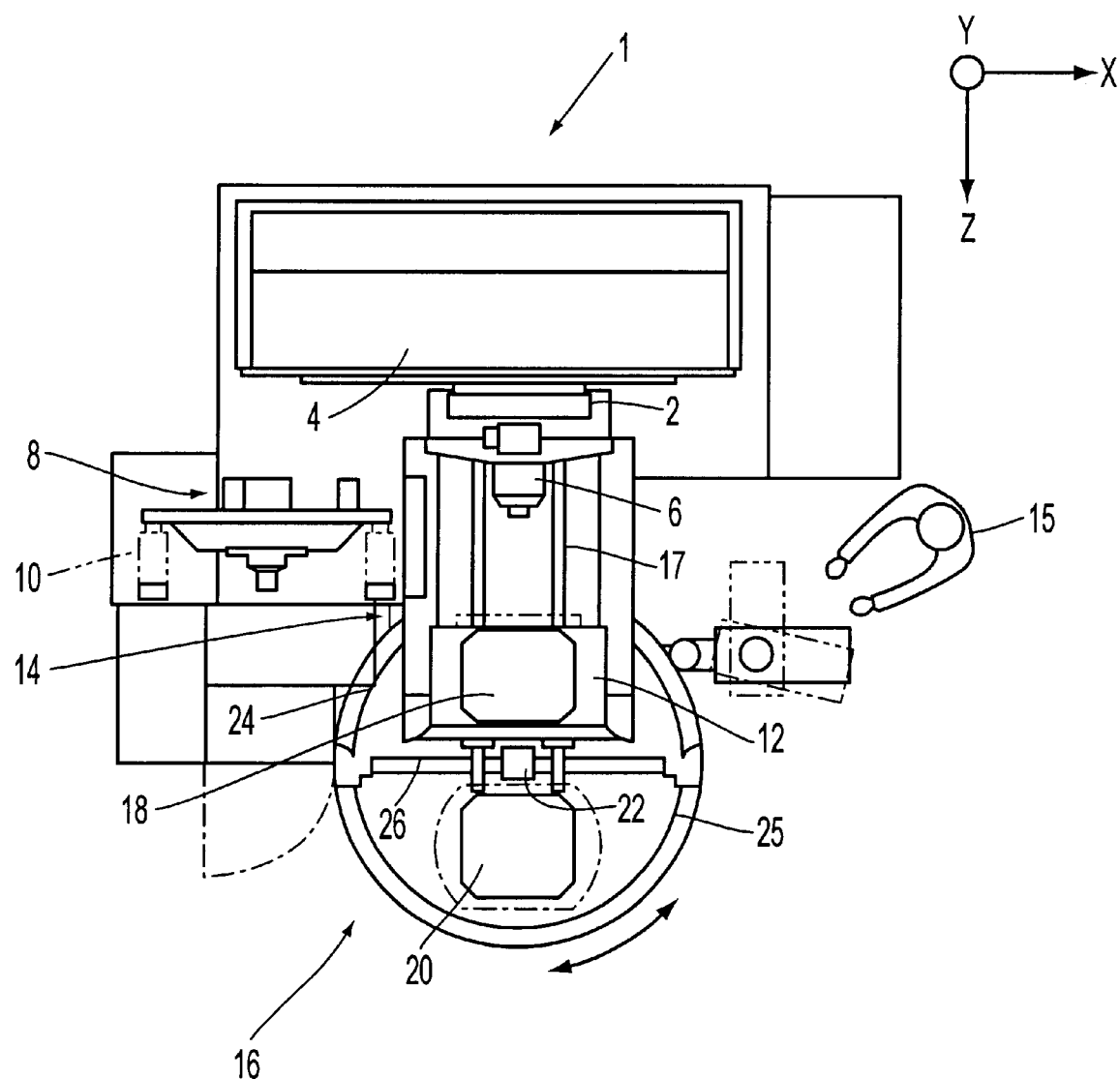
FIG. 1 is a top view of a known machining center for dry processing of workpieces.
Figure 2:
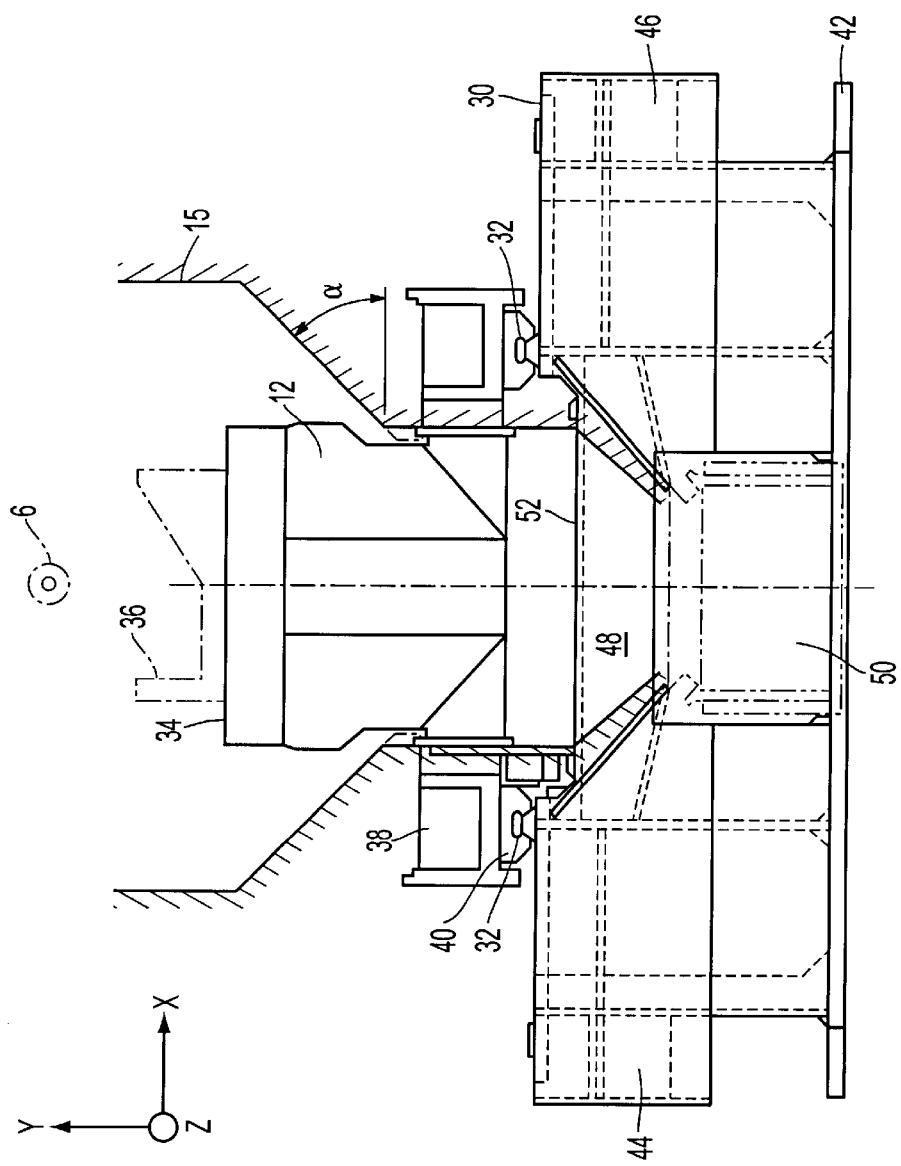
FIG. 2 is a schematic representation of a workpiece supporting according to the invention, enclosed by a processing chamber.

FIG. 2 shows a front view of a machining center 1 according to the invention which is of the columnar type, with the column 4 (FIG. 1) in accordance with FIG. 1 being mounted on a machine bed 30. As was explained at the outset, a spindle carrier or spindle box 2 is guided on the column 4 such as to be displaceable in the X and Y directions, with the drive being effected along the X/Y directional guide members by linear motors not represented here. The workpiece support 12, on which the pallets 18, 20 may alternately be mounted, is guided on the machine bed 30 with the aid of two guide members 32 extending at a parallel spacing from each other so as to be displaceable perpendicularly with respect to the plane of drawing in FIG. 2, i.e., in the Z direction. The workpiece support 12 comprises a mounting surface 34 and mounting means not represented here, for mounting a pallet supplied through the pallet changer 16 on which the workpiece 36 to be processed (indicated by dash-dotted lines in FIG. 2).

At its lower end portion in the representation of FIG. 2, the workpiece support 12 includes two or more brackets 38 jutting out on either side, to which guide carriages 40 are fastened which are displaceable on the guide members 32. The guide members are preferably designed as anti-friction guides free of play.

In the shown embodiment, the forward feed movement of the workpiece support is effected with the aid of two linear drive means, with each linear drive being associated to a respective guide member 32, so that synchronous driving of both linear motors is necessary in order to perform feeding. The like translatory direct drives with linear motors offer dynamic displacement movements and highly accurate positioning. The thrusting forces act directly—without play, without elasticity and without wear. Thanks to direct mounting of the motor on the movable guide carriages, a substantially simplified closed loop is achieved.

The machine bed 30 comprises a common baseplate 42 on which two bed members 44, 46 are positioned. The free space between the bed members 44, 46 in the range underneath the workpiece support forms a discharging space 48 through which chips are guided to a chip conveyor 50 indicated by dash-dotted lines. Via the latter, the produced chips are removed in a direction perpendicular with the plane of drawing (FIG. 2) to a receptacle. The chip conveyor may, for example, be provided with scraping panels (not represented here) which are drawing by a circulating chain.

For reinforcement of the machine bed, the two bed members 44, 46 are connected by means of connecting webs 52 spanning the discharging space 48. The surface area of the connecting webs 52 is, however, small in comparison with the effective surface area of the discharging space 48, so that the connecting webs 52 essentially do not constitute a chip-retaining body. The connecting webs 52 may moreover be arranged outside the displacement range of the feed table 12 so as not to enter into interaction with dropping chips.

The processing chamber (reference numeral 14 in FIG. 1) forms an encapsulated processing space into which the work spindle 6 (FIG. 1) penetrates and in which the workpiece support 12 and the portion of the pallet changer 16 located on the side of the workpiece carrier are arranged. The conveying surface of the chip conveyor 50 basically constitutes the lower delimitation of the processing chamber.

As can be see in FIG. 2, the side walls 15 of the processing chamber extend obliquely in a downward direction towards the chip conveyor 50 in a stepped conical shape, with the minimum cone angle $\alpha$ being about 50°.

Figure 3:
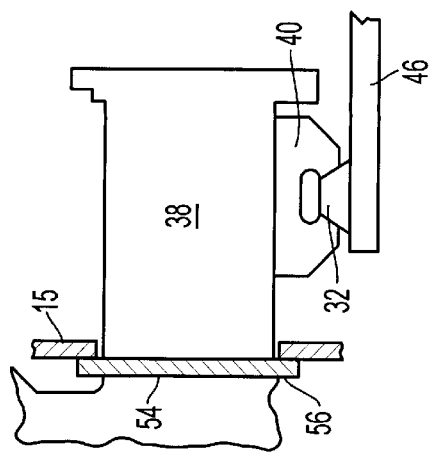
FIG. 3 is a detailed representation of a guide member of a workpiece support of FIG. 2.

In the range of the brackets 38, recesses 54 extending perpendicularly with the plane of drawing of FIGS. 2 or 3 are formed in the side walls 15. The latter figure shows a detailed representation of the right-handed bracket 38 in the representation of FIG. 2, guided on the dovetail guide 32 by means of the guide carriages 40. Accordingly, the bracket 38 extends through the recess 54 which has a length (perpendicularly with the plane of drawing of FIG. 3) at least equalling the maximum displacement range of the workpiece carrier 12. The gap between the outer circumference of the bracket 38 and the inner circumferential surface of recess 54 is covered by means of a sliding metal sheet 56 which slidingly contacts the adjacent major surface of the side wall 15 and is fastened to the bracket 38. The sliding metal sheet 56 may, for example, be formed in several parts of telescoping sliding metal sheets. As a matter of fact, other construction variants for covering the ring gap between bracket 38 and peripheral wall of recess 54 are also possible. What is important is a seal quality that prevents chips from leaving this range, and excessive losses of inert gas in the case where inert gas is used.

The part of the side wall 15 continuing downwardly from the penetrating portion of the brackets 38 is again arranged at an inclination angle $\alpha$ with the horizontal, so that the chips slide along this surface towards the chip conveyor 50.

In this variant, the guide members 32 are arranged outside the processing space whereby they are prevented from entering into interaction with the processing chips. Correspondingly, the linear drive means acting on the guide carriages 40 are also arranged externally of the processing chamber.

The front-side cover in the range of the work spindle 6 is formed by the front wall of the column 4, whereas the opposite cover on the side of the pallet change is formed by the partition 26 (pallet door). The upper termination is formed by a cabin roof, whereas the bottom termination of the processing chamber 14 is formed by a cabin floor and the chip conveyor 50 which may moreover be provided with a lock for removal of the chips from the processing chamber 14.

To the end of reducing the machine weight, the workpiece support 12 and the machine bed 30 are realised in lightweight construction with reinforcing webs which, being of minor importance for the invention, shall not be discussed here.

What is essential in the invention is the fact that owing to the arrangement of the workpiece carrier guide mechanism in accordance with the invention, a chip discharging space 48 basically presenting no obstacles, dead spaces or the like for the chips is created, so that chip removal may be effected as promptly as possible and without major expenditure. The side walls 15 of the processing chamber are formed to have smooth surface so that the chips may slide off towards the chip conveyor 50 by gravity.

A machining tool for dry processing includes an encapsulated workspace having arranged therein a workpiece support which is displaceable on a machine bed. The guide members of the workpiece carrier are arranged externally of the workspace, so that chip removal is note impeded by the guide members of the workpiece carrier.

What is claimed is:

1. A machining tool for processing of a workpiece by means of a tool engaged in a working spindle, said workpiece being mounted indirectly or directly on a workpiece support which is displaceably guided on a machine bed and enclosed by a processing chamber delimiting a workspace, from which chips may be discharged with the aid of chip removal means, wherein a guide mechanism of said workpiece support is arranged externally of said processing chamber with at least one bracket supporting the workpiece support and extending through a wall of the processing chamber.

2. The machining tool according to claim 1, characterised by two brackets jutting out transversely with respect to the direction of guidance.

3. The machining tool according to claim 2, wherein said processing chamber in the range of passages for said brackets comprises recesses covered by cover means arranged on said workpiece support.

4. The machining tool according to claim 3, wherein said cover means are sliding metal sheets.

5. The machining tool according to claim 2, wherein said machine bed comprises two bed members arranged at a distance from each other, where between a discharging space for chips is formed, and wherein one guide member each is fastened on one of said bed members, so that said workpiece support spans said discharging space.

6. The machining tool according to claim 5, wherein said two bed members are connected with each other with the aid of a common baseplate and/or connecting webs.

7. The machining tool according to claim 2, characterised by inclined side walls extending from cover means as far as said chip removal mechanism.

8. The machining tool according to claim 5, wherein said chip removal mechanism is a mechanical chip conveyor.

9. The machining tool according to claim 1, wherein the inclination angle of the wall delimiting said processing chamber is at least 50°.

10. The machining tool according to claim 1, wherein a drive motor is assigned to the guide mechanism.

11. The machining tool according to claim 10, wherein said drive motor has the form of a linear drive.

* * * * *